US012123586B2

(12) United States Patent
Duran

(10) Patent No.: US 12,123,586 B2
(45) Date of Patent: Oct. 22, 2024

(54) UNDERWATER LED LIGHTING FIXTURE OF ULTRA VIOLET LIGHT TO MAKE SHINE PHOSPHORESCENT OR FLUORESCENT MATERIAL WITHIN A SWIMMING POOL OR ANY BODY OF WATER

(71) Applicant: PROAGUA PRODUCTS LLC, Cheyenne, WY (US)

(72) Inventor: Guillermo Duran, Cheyenne, WY (US)

(73) Assignee: Proagua Products LLC, Cheyenne, WY (US)

( * ) Notice: Subject to any disclaimer, the term of this patent is extended or adjusted under 35 U.S.C. 154(b) by 0 days.

(21) Appl. No.: 18/107,221

(22) Filed: Feb. 8, 2023

(65) Prior Publication Data

US 2023/0243497 A1 Aug. 3, 2023

(30) Foreign Application Priority Data

Dec. 10, 2021 (MX) ................... MX/A/2021/015438

(51) Int. Cl.
*F21V 31/00* (2006.01)
*F21K 2/00* (2006.01)
*F21Y 115/10* (2016.01)

(52) U.S. Cl.
CPC .............. *F21V 31/005* (2013.01); *F21K 2/00* (2013.01); *F21Y 2115/10* (2016.08)

(58) Field of Classification Search
CPC ....... F21V 31/005; F21K 2/00; F21Y 2115/10
See application file for complete search history.

(56) References Cited

U.S. PATENT DOCUMENTS

| | | | | |
|---|---|---|---|---|
| 5,122,936 A | 6/1992 | Guthrie | | |
| 2023/0194075 A1 * | 6/2023 | Duran | ..................... | F21S 8/024 362/267 |

FOREIGN PATENT DOCUMENTS

| | | | |
|---|---|---|---|
| CN | 1245877 | A | 3/2000 |
| CN | 205919244 | U | 2/2017 |
| CN | 111322563 | A | 6/2020 |

* cited by examiner

*Primary Examiner* — Karabi Guharay
(74) *Attorney, Agent, or Firm* — Akerman LLP

(57) ABSTRACT

The present invention refers to an ultraviolet light lamp/luminaire system to make phosphorescent or fluorescent material shine in a swimming pool or in any body of water characterized in that it consists of the association of a) at least one defined submersible ultraviolet light lamp/luminaire by a sealed tubular casing defining a trailing end and a leading end; the rear end comprises a waterproof electrical power supply socket or plug and the front end comprises a lens with a waterproof seal, and internally houses a panel of a plurality of ultraviolet light emitting diodes (hereinafter UV LEDs) controlled by an electronic circuit control unit for the UV LEDs connected to the waterproof electrical power supply socket or plug and b) fluorescent or phosphorescent material which may be but is not limited to small aggregate rhinestones, tiles, mosaics, vinyl or fiberglass canvas surface, figures or other objects or accessories, arranged inside the body of water so that they shine in any environment, as long as the ultraviolet light source is on.

5 Claims, 4 Drawing Sheets

UNDERWATER LED LIGHTING FIXTURE OF ULTRA VIOLET LIGHT TO MAKE SHINE PHOSPHORESCENT OR FLUORESCENT MATERIAL WITHIN A SWIMMING POOL OR ANY BODY OF WATER

CROSS-REFERENCE TO RELATED APPLICATIONS

The present application claims priority to Mexican Patent Application No. MX/a/2021/015438, filed Dec. 10, 2021, the disclosure of which is hereby incorporated herein by reference in its entirety.

FIELD OF INVENTION

The present invention falls within the field of the industry of lighting fixtures and illumination systems, in general; or in particular it is related with light fixtures of swimming pool lighting systems or similar. More specifically this invention refers to a system of a Ultra Violet LED light fixture to make shine bright phosphorescent or fluorescent material in a swimming pool or in any body of water.

BACKGROUND OF THE INVENTION

Modern swimming pools require good lighting, which not only improves the appearance of the pool, but also allows you to enjoy its use at any time of the day without risk of accidents or shocks due to lack of lighting.

For this, there are two types of lamps for swimming pools, halogen lamps and LED lamps, however, halogen lamps have a series of undesirable characteristics, for example, they require a specific and more delicate installation, so they cannot be installed on any surface, halogen lamps also emit heat and ultraviolet radiation.

Another situation that presents in swimming pools and spas, and other bodies of water is that the type of illumination and the lights traditionally used do not permit the visualization of phosphorescent and fluorescent material that can be but are not limited to: Pebble aggregates, mosaic, tiles, or in swimming pools with vinyl liner surface or of glass fiber; with the specific purpose to make it shine bright/energize these materials to make shine in the darkness.

Today there is no system in existence that could be used in bodies of water or around them that uses Ultra Violet light fixture to make shine bright/energize phosphorescent or fluorescent materials like pebble or aggregate, tile or mosaics or vinyl liner or glass fiber.

In Swimming pools, spas, and other bodies of water, sometimes materials are aggregated permanently in the Surface like tiles or mosaics, vinyl liner or glass fiber Surface or Mosaics that are not visible, nor shine in the darkness nor are illuminated by any source of Ultra Violet light.

The light fixture of this invention can be installed either underwater but also in the Surface or floating, in combination with the phosphorescent and fluorescent accessories installed within the body of water so that these accessories are lit and brighten, as long as the source of Ultra Violet light is on (lit).

A search was made to determine of a near alike technique and the following information was found:

A document was found of a utility model number CN205919244U of Lin Huaxiang and Xu Yaoyuan published on Feb. 1, 2017 which discloses a swimming pool lamp, including lampshade, lamp plate, body, impeller cover, water blade, stator, sealed cap and check valve, the lamp plate cover is set on the body and installed in the housing space that the lamp shade and this coupling of the body is formed, and the stator is fixed in the housing space housing into which the body and the sealed tectiform, the water sheet passes through the porcelain shaft configuration impeller cover, and the body between the cover is set on the periphery of the stator, the check valve is fixed at the lower end of the inner impeller cover through the one-way valve space. Install a pool lamp in the filter equipment that has the pool of the water pump, in the pool lamp installation of the pool water inlet department, the rivers promote the water sheet and rotate, and the rotor that is installed in the water sheet will rotate for the stator to provide lighting power for the lamp plate. Installing the pool lighting installation from other local wiring can be avoided in this way, on the one hand, energy can be saved, on the other hand, it can also be reduced and the lighting installation is installed to give the swimmer the inconvenience that the trip brings.

Nevertheless, this lamp does not include any means of Ultra Violet illumination, not it is associated with phosphorescent or fluorescent elements installed inside the body of water so that they light up in any ambience, as long as the source of ultra violet light is on.

US patent document U.S. Pat. No. 5,122,936 dated Jun. 16, 1992, by inventor John H. Guthrie, was also found, which discloses an underwater light assembly to be mounted on the surface of a pool wall, includes a backing plate that Adjacent to said pool surface when the assembly is mounted to said wall, a lens hermetically mounted relative to said backing plate and defining a waterproof chamber therewith, and an electric light source or lamp mounted within said chamber and connectable to an electrical power source by means of an electrical cable extending from said electrical light source or lamp through a waterproof seal in said backing plate. An annular shell member extends around and rearward from the periphery of the backing plate. The annular housing element has a plurality of openings formed around its circumference, so that when said light assembly is mounted on said pool surface, pool water can flow through a compartment defined by said surface, the housing element and the backing plate.

Nevertheless, this lamp does not include any means of Ultra Violet illumination, not it is associated with phosphorescent or fluorescent elements installed inside the body of water so that they light up in any ambience, as long as the source of ultra violet light is on.

Document CN111322563A of Lu Qingqiu and Li Weijian, published Jun. 23, 2020, discloses a swimming pool light that purports to resolve the problem that an existing lighting lamp in a swimming pool is problematic to service or maintain. The key points of the technical schematic are the following: the lighting fixture in the pool includes a body of a portable light and a heat conductor and a light source; a mounting slot in the portable light body; both ends of the mounting slot are open structures, in which the screen of the light source that emits the light is on one sealed end and the other end is sealed and covered with a cover top; an internal slot of heat transfer is on the mounting slot; the exterior wall of the interior slot of a metal heat transfer is mounted next to the internal wall of the installation plate, and a mounting slot is formed in the body; the light source includes a PCB provided with a light cable, in which the PCB is inserted and the holding slot, and the lamp cord are connected electrically to the circuit in the PCB; the main supply of energy and the lamp cord are connected to a thermo resistor in series PTC; and the thermos resistor PTC is set on the holding slot. In alignment to the swimming pool light fixture, to reduce the probability to suffer damage, the frequency of service is reduced and therefore, any user can service the pool light comfortably.

Nevertheless, this lamp does not include any means of Ultra Violet illumination, not it is associated with phosphorescent or fluorescent elements installed inside the body of water so that they light up in any ambience, as long as the source of ultra violet light is on.

A Document was found as number CN1245877 from Kazuo Nakano from the 24 Aug. 1998 that reveals a light fixture to illuminate squares. In the image or square, at least one part is covered with a special material, so that such material covering the lamp can shine when it reflects uviol Light. Such illuminator has a light source formed with an uviol light and a second light source of illumination formed by an incandescent light and the light uviol both can be controlled by a circuit of control, and can be lit or shut off according to a selected sequence. When the light is on the incandescent light is lit and the uviol light is OFF, the image appears to be a daylight scenery, and when the light is off and the uviol light is on, the image in the square appears as a night scenery.

Nevertheless, this lamp does not include any means of Ultra Violet illumination, not it is associated with phosphorescent or fluorescent elements installed inside the body of water so that they light up in any ambience, as long as the source of ultra violet light is on.

As it can be observed, there are several types of lights for swimming pools, but None in any case include means of ultraviolet LED light, nor it is isolated with phosphorescent or fluorescent elements dispersed around the pool or the body of water so that these elements glow in the dark in any moment as long as the source of ultraviolet light is lit or ON.

The present invention has the main purpose of making available this system of lighting and glow in the dark to be used in swimming pools and or bodies of water in and around them using a ultra Violet LED light to make phosphorescent and/or Fluorescent elements glow in the dark, being but limited to tiles, mosaics, pebble and aggregates or vinyl liner or glass fiber surface or other objects disposed on walls and in the bottom of swimming pools or spas, Jacuzzis or portable spas and other bodies of water.

OBJECTIVES OF THE INVENTION

The main objective of the present invention is to make available a system to be installed in swimming pools and different bodies of water in or around them that in combination of LED Ultra Violet Lighting Fixture to glow phosphorescent and/or Fluorescent materials already in the Surface and walls of the Pool or added as tiles, mosaics, vinyl liner or fiber glass surfaces or other objects, dispersed and arranged on the bottom and walls or suspended in the Swimming Pool, Spas, Jacuzzis, or any other bodies of water.

Another Objective of the present invention is to provide such system of Ultra Violet LED Light Fixture to help make glow any material in and around any body of water, in which such light source can be on a fixed position or portable/movable or installed on walls or bottom of the pool or any other body of water, or it can be suspended floating outside the body of water, even suspended around or above the pool or any other body of water.

Other objective of this invention is to provide such system Ultra Violet LED light fixture/lamp to make glow any phosphorescent or fluorescent material in a swimming pool or any other body of water, in which the lamp or light fixture includes ultra violet light emitting diodes that can me submersed and that is of easy installation and easy to maintenance/service.

Another objective of the present invention is to provide such system of Ultra Violet LED lamp or light fixture to make glow any and all phosphorescent or fluorescent material in the swimming pool or on any other body of water that is also practical, efficient and functional.

Another objective of such invention is to provide such system of Ultra Violet LED lamp or light fixture to make glow any and all phosphorescent or fluorescent material in the swimming pool or on any other body of water, where it can installed with EASE by any individual without the need to have advanced knowledge in the installation of light fixtures.

And all this qualities, purpose and benefits will be evident when a general description and detailed description of the present invention supported by the following illustrations.

BRIEF DESCRIPTION OF THE INVENTION

In general, the system composed of the submersible ultraviolet LED light/light fixture, to make GLOW the phosphorescent and or fluorescent elements in a swimming pools or any other body of water, in combining at least one submergible lamp or light fixture defined by a tubular nicheless light built hermetically on both ends; includes the quick female connector or electrical water sealed feed in the back and in the other front end a lens with a water resistant seal, and an internal several LED Ultra Violet emitting light Diodes (U.V. LEDs) controlled by an electronic PCB board for powering and controlling the electrical feed for the U.V. LEDs connected by the female connector or electrical input, (water proof) and in combination with phosphorescent and or fluorescent material can be but are not limited to: Aggregate or pebble, mosaics, tiles, vinyl liner or fiber glass surface or any other objects in or around the body of water that will GLOW in any ambience as long as the U.V. Light emitting lamp or light fixture is ON.

The preferred modality of the invention is that the tubular body of the lamp or light fixture presents to sealed ends one with the back to connect the electrical cord arranged to receive the quick connect adapter precisely on the back end of the light to fit by threaded end a sealed cap that represent a water resistant seal; such back end has a central orifice with a cable designed to fit tight by threaded water resistant seal un with a female connector for a water sealed electrical input; such tubular body of the light fixture or lamp represents such a design in a ring format at the back end of the body, designed to receive electrical supply and to dissipate heat away from the light that is internally placed at the back end of the light on which the internal components are fixed, such as the PCB board and the U.V. LEDs so that the heat produced by the U.V. LEDs UV when they are lit (on) will dissipate the heat by such heat sink device; with a frontal glass lens in front of the light fixture of lamp, on the opposite end of the tubular body fixed by a silicon seal and threaded cap, to seal and threaded in the frontal end of such tubular body of the light fixture or lamp, of which joint element produces such a water resistant seal; protecting the PCBN board and electrical circuit and control for the lighting of the U.V. LEDs stored inside the tubular body and connected in the opposite end with the female connector and cable for the electrical feed for the control, operation and turning on and off.

In the preferred modality of the invention, such flange includes a ring end externally extending the tubular section of the light fixture or lamp that presents an external cable to be connected on the body of the light fixture or lamp as a means of sealing or closing.

Such submersible light fixture or ultra violet lamp is designed to be fitted inside the fixed pipe on the Wall ends or bottom of the swimming pool, spa, Jacuzzi or any other body of water, or to be placed in or around any body of water or suspended over the water or floating over the swimming pool, spa, Jacuzzi, or any other body of water in or around any body of water.

In the preferred modality of the invention, such heat diffuser or heat sink element is physically in contact with the internal walls of the body of the light fixture or lamp to facilitate the dissipation of heat away from itself.

In the preferred modality of the invention the wave length of the Ultra violet Light or the U.V. Light emitting diodes are in the spectrum of Ultra Violet light of 365 nm a 415 nm.

When the diodes of Ultra Violet light are turn on, over the phosphorescent or fluorescent materials like pebble, aggregate tile, mosaics or any Surface such as vinyl liner or glass fiber Surface or plastic accessories that are illuminated by the U.V. LEDs in the wave lengths aforementioned, the emitted light will cause the materials to GLOW in the dark either inside or around the pool or the body of water and its surroundings.

To better understand the characteristics of the invention the present description is complemented as part of this presentation of the drawings, with the purpose of illustrating but are not limited to the ones described next.

Figure 1:
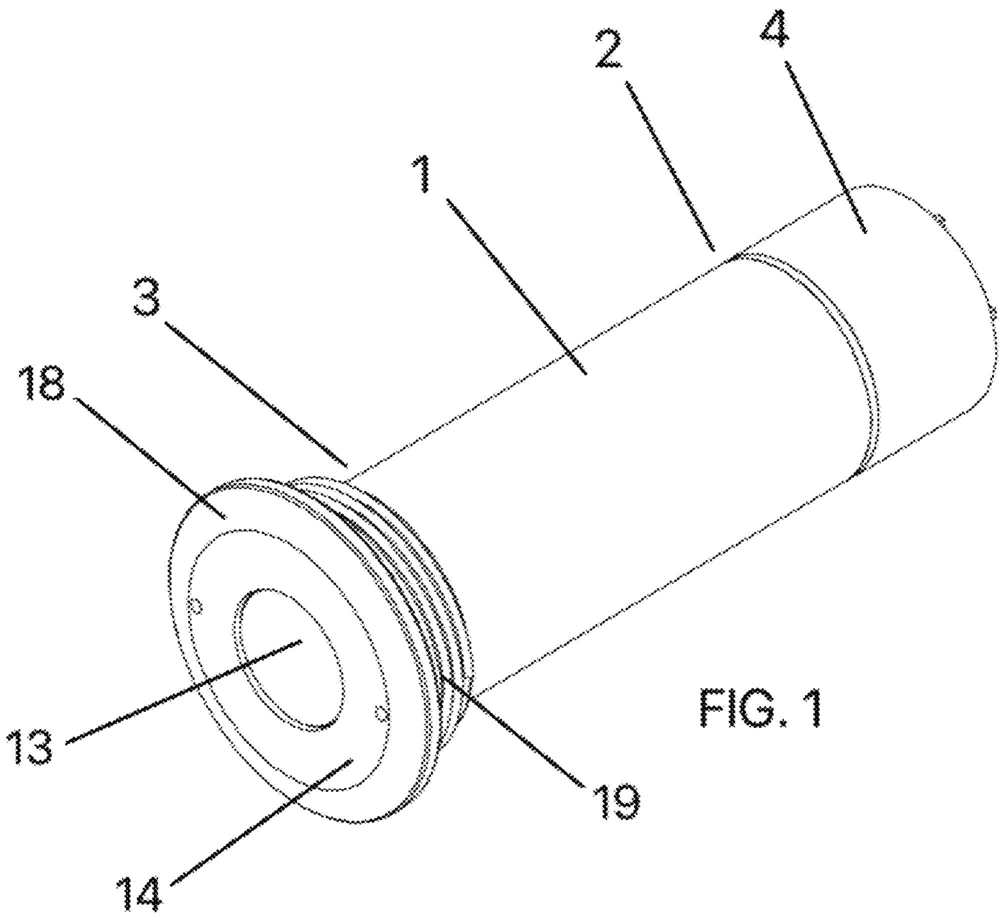
FIG. 1 shows the perspective of the conventional light fixture/lamp of U.V. Diodes, in conformity with the present invention.
Figure 2:
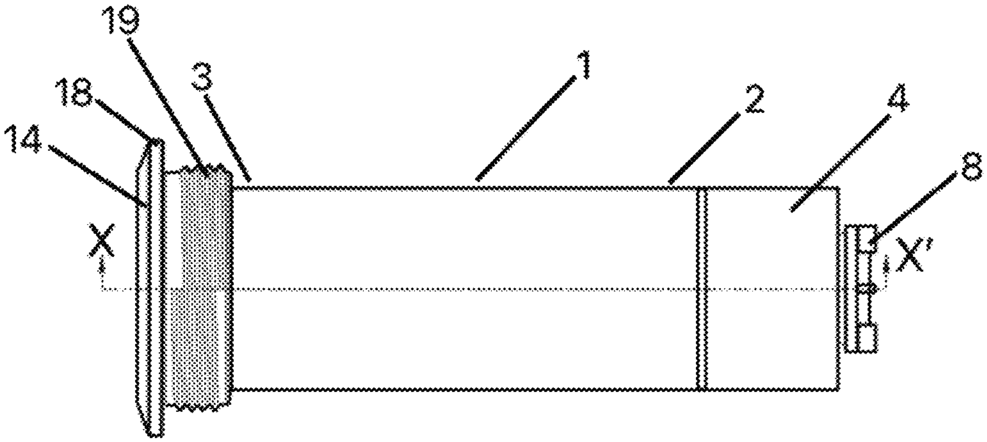
FIG. 2 shows a lateral view of the light fixture/lamp of U.V. Diodes, in conformity to the present invention.

For a better understanding of the invention, we will proceed to detail some of the modalities of this invention, showing some of the drawing with illustration purpose but not limited to the present description of this invention.

DETAILED DESCRIPTION OF THE INVENTION

The characteristic details of the invention of this system of a light fixture/lamp of Ultra Violet LEDs light or diodes, to make Glow in the dark material both phosphorescent or fluorescent shine bright in a swimming pool or any other body of water, will be shown in the following description and the drawings attached, serving as a reference to represent the parts described.

Figure 3:
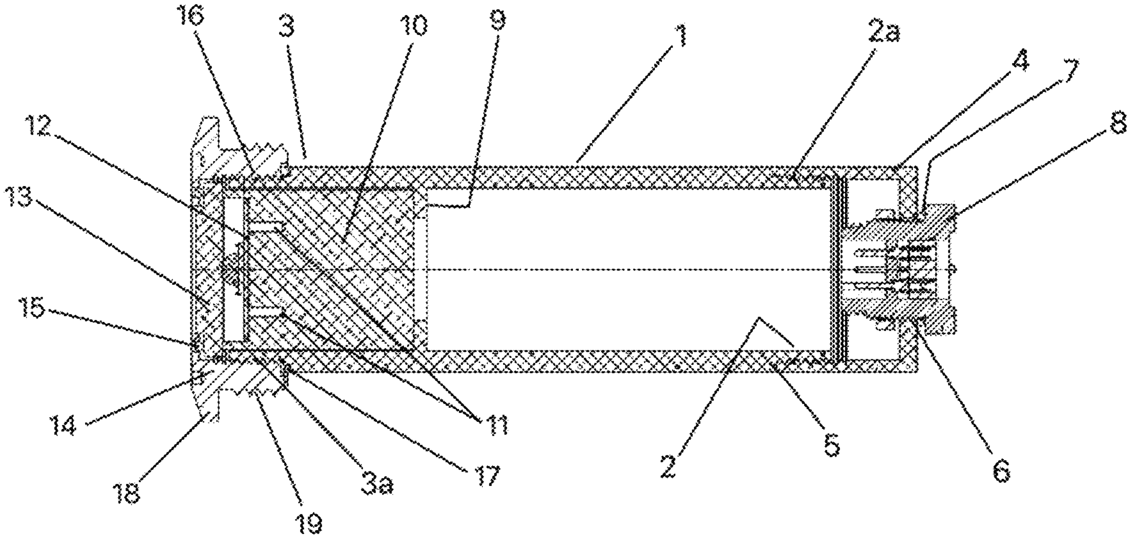
FIG. 3 show a longitudinal cut in the X-X' axis, showing in the FIG. 2, of the light fixture/lamp of U.V. Diodes of Ultra Violet Light in conformity with the present invention.

With reference to the FIGS. 1 and 3 and particularly FIG. 3, the U.V. Ultra Violet light fixture/lamp that makes phosphorescent or fluorescent glow in the dark material shine bright in a swimming pools or any other body of water consists of a tubular shape body (1) that has a back end (2) and a front end (3) both ends represent the exterior (2*a*, 3*a*), having a cable adapted to the back end (2) to receive in an shredded connector adapter in a ring form that fits the back end (4) in which joint has an element of permanent water resistant seal (5); such back end includes a central orifice (6) with an internal cable configured to adapt or connect by shredded nut with water resistant seal (7) a female adaptor connector of electrical water resistant feed (8); such tubular body (1) presents an internal ring cap (9) next to its back end (3), designed to receive and to help dissipate/diffuse the heat (10) that builds up inside the tubular body of the light fixture/lamp (1) and on top of which a means to connect (11) a panel of several Ultra Violet emitting Diodes (LEDs UV) (12) so that the heat produced by the UV LEDs in its lighted state are dissipated by such heat sink device (10); a lens (13) is set on the external end of the front end (3) of the tubular body (1) and is held by the plastic flange (14) with elements to water seal resistant (15), included in the interior (16) and it is screwed in the back end (3) of such tubular body of the light fixture/lamp (1), in which seal an element of water sealant is set (17); an electronic PCB Board for control of turning on and off (Not Shown) of the U.V. LEDs is placed inside such tubular body (1) and is connected by the female quick connector adaptor of water resistant electrical feed (8) and with several UV LEDs and control panel for the Diodes of Ultra Violet emitting light (UV LEDs) (12).

Such flange (14) is made of a circular border in front (18) and externally of the tubular section of the Light Fixture/Lamp presenting an external cable (19) to be screwed in on the back end of the tubular body by a proprietary connector (not shown).

The wave length/frequency of the Ultra Violet Diodes that is emitted by the U.V. Light is in the spectrum of the Ultra Violet Light (UV) from 365 nm to 415 nm.

Figure 4:
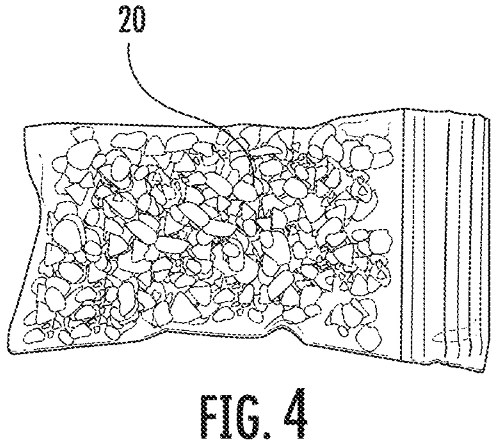
FIGS. 4 & 5 show frontal views of bags of pebble rocks and aggregate material both phosphorescent and fluorescent that are added to the finishing of walls and bottom of swimming pools, spas, Jacuzzi, or any other body of water to be lighted (lit)/Illuminated by the Light fixture/lamp of U.V. Ultra Violet Diodes.
Figure 5:
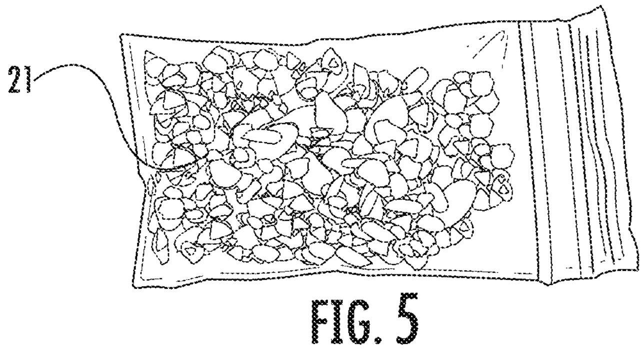

FIGS. 4 & 5 show the pebbles and aggregate material (20, 21) of a plastic material both phosphorescent and fluorescent that are added to the Walls and floors of the swimming pools, or any other body of water that will be illuminated by the light fixture/lamp of Ultra Violet diodes U.V. LED Light.

Figure 6:
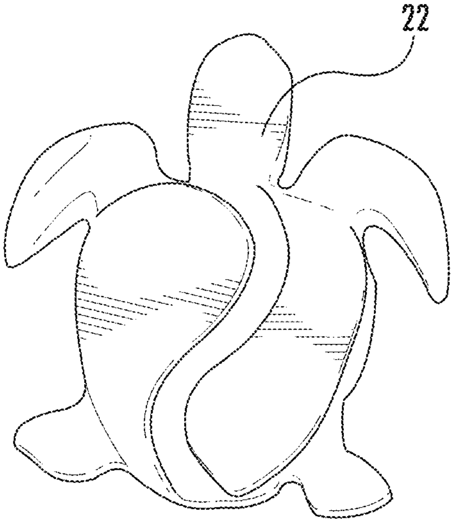
FIG. 6 shows a top view of the mosaic figure of a turtle manufactured of a plastic material that is phosphorescent and or fluorescent that is added to the walls or bottom of the swimming pool, spa, Jacuzzi, or any other body of water that will be illuminated by the U.V. Ultra Violet Lighting Fixture/lamp of U.V. Diodes.

FIG. 6 shows a top view of a turtle mosaic/FIG. 22) with two or more different colors, made of a plastic material that is either phosphorescent or fluorescent that are added to the walls or floors of the desired swimming pools or spa or jacuzzi or any other body of water that will be illuminated by the U.V. LED Diodes Light fixture/lamp of ultra Violet light.

Figure 7:
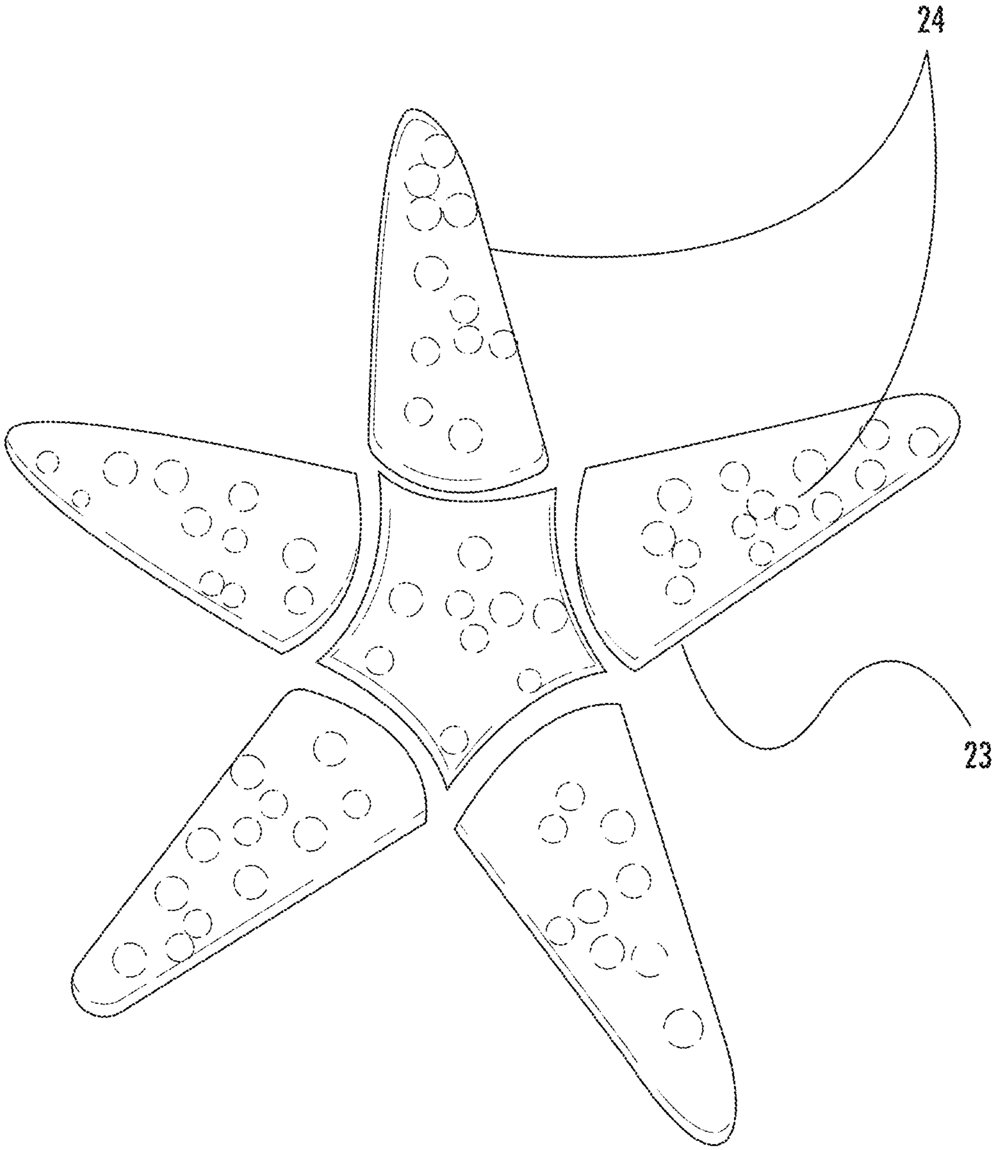
FIG. 7 show a top view of a figure, mosaic of a sea star of a determined color manufactured of plastic material or phosphorescent or fluorescent material for decorating the walls or bottom floor of a swimming pool, spa, Jacuzzi or any body of water that will be illuminated by a U.V. Ultra Violet Light fixture or lamp with the U.V. Ultra Violet Diodes.

FIG. 7 shows a top view of a sea star (23) of a determined color or spotted color (24) or any other color, made of a plastic material that is either phosphorescent or fluorescent that are added to the walls or floors of the desired swimming pools or spa or Jacuzzi or any other body of water that will be illuminated by the U.V. LED Diodes Light fixture/lamp of ultra Violet light.

When the U.V: LED or the Ultra Violet Diodes lights are on and emit ultra Violet light over the phosphorescent and fluorescent material shown in FIGS. 4 & 7 and other materials as mosaics, tiles or any Surface such as vinyl liner or glass fiber, that has elements that contain phosphorescent or fluorescent elements the U.V. LEDs with the specific wave length or frequency of Ultra Violet light (UV) of 365 nm to 415 nm, the U.V. Light will cause these materials to be bright or glow in the dark inside the swimming pool or any body of water.

The invention has been described sufficiently so that any person with average knowledge in this matter will reproduce and obtain the results that we mentioned in this invention presentation. Nevertheless, any knowledgeable person in the field related to this invention, can be capable of make modifications not described or included in this document, so, if for the application of any modification are structured in such way or in the process of manufacturing it is required that the matter claimed in the following claims, such structures should be considered within the reach of this invention.

What is claimed is:

1. An ultraviolet light lamp/light fixture system for illuminating phosphorescent or fluorescent material in a swimming pool or body of water comprising, at least one submersible ultraviolet light lamp/luminaire defined by a tightly coupled tubular housing defining a rear end and a front end, the rear end comprising a waterproof power supply socket or female connector and the front end comprising a lens with a waterproof seal, and wherein the tubular housing internally houses a panel of a plurality of ultraviolet light emitting diodes, UV LEDs, controlled by an electronic control circuit for turning on the UV LEDs connected to the waterproof power supply socket or female connector; and fluorescent or phosphorescent material comprising one or more of small aggregate rhinestones, tiles, mosaics, vinyl or fiberglass canvas surface, figures or accessories arranged within the swimming pool or body of water to shine when the ultraviolet light source is turned on.

2. The ultraviolet light lamp/light fixture system for illuminating phosphorescent or fluorescent material in a swimming pool or body of water according to claim 1, wherein the rear end is adapted to threadably receive a rear tubular cover at a joint of which a waterproof sealing element is arranged, wherein the rear tubular cover comprises a central hole with an internal cable configured to receive the waterproof power supply socket or female connector in a threaded manner with a waterproof seal, wherein the tubular housing internally has an annular edge close to the front end configured to receive and support a heat sink that is housed in the front end and on which the panel of the plurality of UV LEDs is fixed with fixing means such that heat produced by the plurality of UV LEDs when turned on is dissipated by said heat sink, wherein the lens is arranged on the front end of the tubular housing and is held by a flange, wherein the flange includes an inner cable and is screwed onto the front end of said tubular housing at a joint of which a sealing element is arranged as the waterproof seal, and wherein the electronic control circuit is housed inside said tubular housing and is connected to the waterproof power supply socket or female connector plug.

3. The ultraviolet light lamp/light fixture system for illuminating phosphorescent or fluorescent material in a swimming pool or other body of water according to claim 1, wherein the lens is arranged on the front end of the tubular housing and is held by a flange, wherein the flange includes an inner cable and is screwed onto the front end of said housing at a joint of which a waterproof sealing element is arranged as the waterproof seal, and wherein said flange comprises a protruding ring edge and externally in its tubular section presents a cable external to be screwed into another casing or other fixing means.

4. The ultraviolet light lamp/light fixture system to for illuminating phosphorescent or fluorescent material in a swimming pool or other body of water according to claim 1, wherein the tubular housing internally has an annular edge close to the front end configured to receive and support a heat sink that is housed in the front end and on which the panel of the plurality of UV LEDs is fixed with fixing means such that heat produced by the plurality UV LEDs when turned on is dissipated by said heat sink, and wherein said heat sink is in physical contact with an internal wall of said tubular housing to promote heat dissipation.

5. The ultraviolet light lamp/light fixture system for illuminating phosphorescent or fluorescent material in a swimming pool or other body of water according to claim 1, wherein the plurality of UV LEDs illuminate in the ultraviolet light spectrum (UV) from 365 nm to 415 nm.

* * * * *